United States Patent [19]

Randolph

[11] Patent Number: 5,029,266
[45] Date of Patent: Jul. 2, 1991

[54] CONTROLLED BATTERY CHARGING SYSTEM

[75] Inventor: D. Bruce Randolph, Nashville, Tenn.

[73] Assignee: Perma-Charger, Inc., Hermitage, Tenn.

[21] Appl. No.: 469,307

[22] Filed: Jan. 24, 1990

[51] Int. Cl.$^5$ .............................................. H02J 7/10
[52] U.S. Cl. ........................................ 320/31; 320/23; 320/35; 320/39
[58] Field of Search ................ 320/22, 23, 31, 32, 320/33, 35, 39

[56] References Cited

U.S. PATENT DOCUMENTS

| | | | |
|---|---|---|---|
| 3,683,257 | 8/1972 | Mas | 320/31 |
| 3,740,636 | 6/1973 | Hogrefe et al. | 320/35 X |
| 3,748,568 | 7/1973 | Ackermann | 320/39 X |
| 3,766,463 | 10/1973 | Ruben | 320/23 |
| 3,854,082 | 12/1974 | Nasby et al. | 320/22 |
| 3,911,351 | 10/1975 | Saslow | 320/35 X |
| 3,925,714 | 12/1975 | Sherman, Jr. | 320/32 X |
| 3,969,665 | 7/1976 | Rowas | 320/35 |
| 3,987,354 | 10/1976 | Mason | 320/39 |
| 4,006,397 | 2/1977 | Catotti et al. | 320/39 X |
| 4,019,111 | 4/1977 | Bennefeld | 320/39 X |
| 4,031,451 | 6/1977 | Gordon | 320/39 X |
| 4,061,956 | 12/1977 | Brown et al. | 320/23 X |
| 4,131,841 | 12/1978 | Bennefeld | 320/23 |
| 4,163,934 | 8/1979 | Lawn | 320/32 X |
| 4,371,826 | 2/1983 | Shelly | 320/32 X |
| 4,431,959 | 2/1984 | Remmers | 320/39 X |
| 4,433,277 | 2/1984 | Carollo et al. | 320/33 X |
| 4,513,238 | 4/1985 | Orban | 320/23 |
| 4,843,299 | 6/1989 | Hutchings | 320/31 |

Primary Examiner—Steven L. Stephan
Assistant Examiner—Kristine Peckman
Attorney, Agent, or Firm—Harrington A. Lackey

[57] ABSTRACT

A battery charging system incorporating a unijunction relaxation oscillator circuit and an electronic current limiting control circuit for de-energizing the relaxation oscillator circuit when the battery charging current exceeds a certain minimum value. The system preferably also includes a voltage control circuit and a temperature control circuit all of which are connected in parallel with the electronic current limiting control circuit in order to de-energize the relaxation oscillator circuit when the respective voltage and temperature of the system exceeds certain predetermined minimum values. The electronic current limiting control circuit, the voltage control circuit and the temperature control circuit are included in corresponding solid state integrated circuits.

10 Claims, 2 Drawing Sheets

CONTROLLED BATTERY CHARGING SYSTEM

BACKGROUND OF THE INVENTION

This invention relates to an electrical battery charging system, and more particularly to a controlled electrical battery charging system.

Electrical storage battery charging systems are well known in the art, as illustrated in the following U.S. patents:

| | | |
|---|---|---|
| 3,382,425 | Legatti | May 7, 1968 |
| 3,766,463 | Ruben | Oct. 16, 1973 |
| 3,854,082 | Nasby et al | Dec. 10, 1974 |
| 3,911,350 | Swope | Oct. 7, 1975 |
| 3,925,714 | Sherman, Jr. | Dec. 9, 1975 |
| 3,969,665 | Rowas | July 13, 1976 |
| 4,006,397 | Catotti et al | Feb. 1, 1977 |
| 4,019,111 | Bennefeld | Apr. 19, 1977 |
| 4,031,451 | Gordon | June 21, 1977 |
| 4,131,841 | Bennefeld | Dec. 26, 1978 |
| 4,163,934 | Lawn | Aug. 7, 1979 |

All of the above patents, except the Swope patent 3,911,350, disclose battery chargers including a rectifier circuit incorporating SCR's for controlling the charging current.

The patents to Legatti, Ruben, Nasby et al, Rowas, Gordon and Lawn disclose SCR rectifier circuits in a battery charger which are triggered by a unijunction transistor.

The Ruben and Gordon patents also disclose a unijunction transistor with an RC timer circuit coupled to a control transistor.

In the Legatti patent, there is a DC voltage control circuit and a DC current control circuit for transmitting signals to the control transistor 66 in order to activate the unijunction transistor 46 and trigger the SCR's 10 and 12.

The Ruben patent discloses a voltage control circuit including the transistors Q5 and Q6 and a potentiometer R13.

The Nasby et al patent discloses a voltage control circuit and a current control circuit connected to an AND circuit 28 for activating the SCR control circuit 30.

The Swope patent 3,911,350 discloses a number of battery charging circuits incorporating a temperature sensor for sensing the temperature of the transformer in order to control the charging current.

The battery charging circuit of the Rowas patent 3,969,665 incorporates a thermistor 29 for sensing the temperature of the battery.

Catotti et al discloses a voltage control circuit and a temperature control circuit each of which is adapted to transmit excessive signals to an OR logic circuitry for triggering the SCR.

The Bennefeld battery charger includes a system for automatically changing from a current-controlled mode to a voltage-controlled mode. The integrated circuit chip 118 is used as a voltage regulator.

The Gordon patent 4,031,451 is an improvement over the Ruben battery charger and includes a current limiting circuit and an overshoot circuit for transmitting excessive or error signals to the unijunction transistor Q1 for triggering the SCR's in the rectifier circuit.

The U.S. patents to Ruben, Nasby et al, Catotti et al, both Bennefeld patents and the Gordon patent disclose battery charging circuits in which the system is not completely turned off after the battery is fully charged. These battery charging circuits include low current or trickle current after the battery has been substantially fully charged, primarily to maintain the charge on the battery.

None of the above cited patents disclose a battery charging system including control circuits for completely burning off the charging current to the battery when the voltage, temperature, and/or charging current exceed corresponding maximum values.

Furthermore, none of the above cited references disclose a battery charging system incorporating an electronic current limiting integrated circuit in combination with an automatic signal circuit for sequentially signalling progressively increasing values of the charging current.

SUMMARY OF THE INVENTION

It is therefore an object of this invention to provide an electrical battery charging system which is safe and reliable and is fully automatic.

Another object of this invention is to provide an electrical battery charging system which is provided with control circuits for controlling all three of the conditions of excessive battery voltage, excessive charging current, and/or excessive temperatures.

A further object of this invention is to provide an electrical battery charging system incorporating solid state controls for voltage, charging current and temperature, and an accurate voltage regulator which is temperature insensitive.

Another object of this invention is to provide an electrical battery charging system incorporating solid state control circuits for completely turning off the charging current when the predetermined excessive values of voltage, charging current, or temperature are attained.

Another object of this invention is to provide a battery charging system incorporating a solid state integrated circuit in which its negative supply voltage pin is tied to the center tap of the secondary of a step-down transformer made more negative by the connection of the center tap through a grounded resistive wire.

A further object of this invention is to provide an electrical battery charging system incorporating a solid state, electronic, current limiting integrated circuit which is combined with the signal circuit for sequentially activating electronic signals as the charging current increases in order to register changing values of the charging current.

DESCRIPTION OF THE PREFERRED EMBODIMENT

Figure 1:
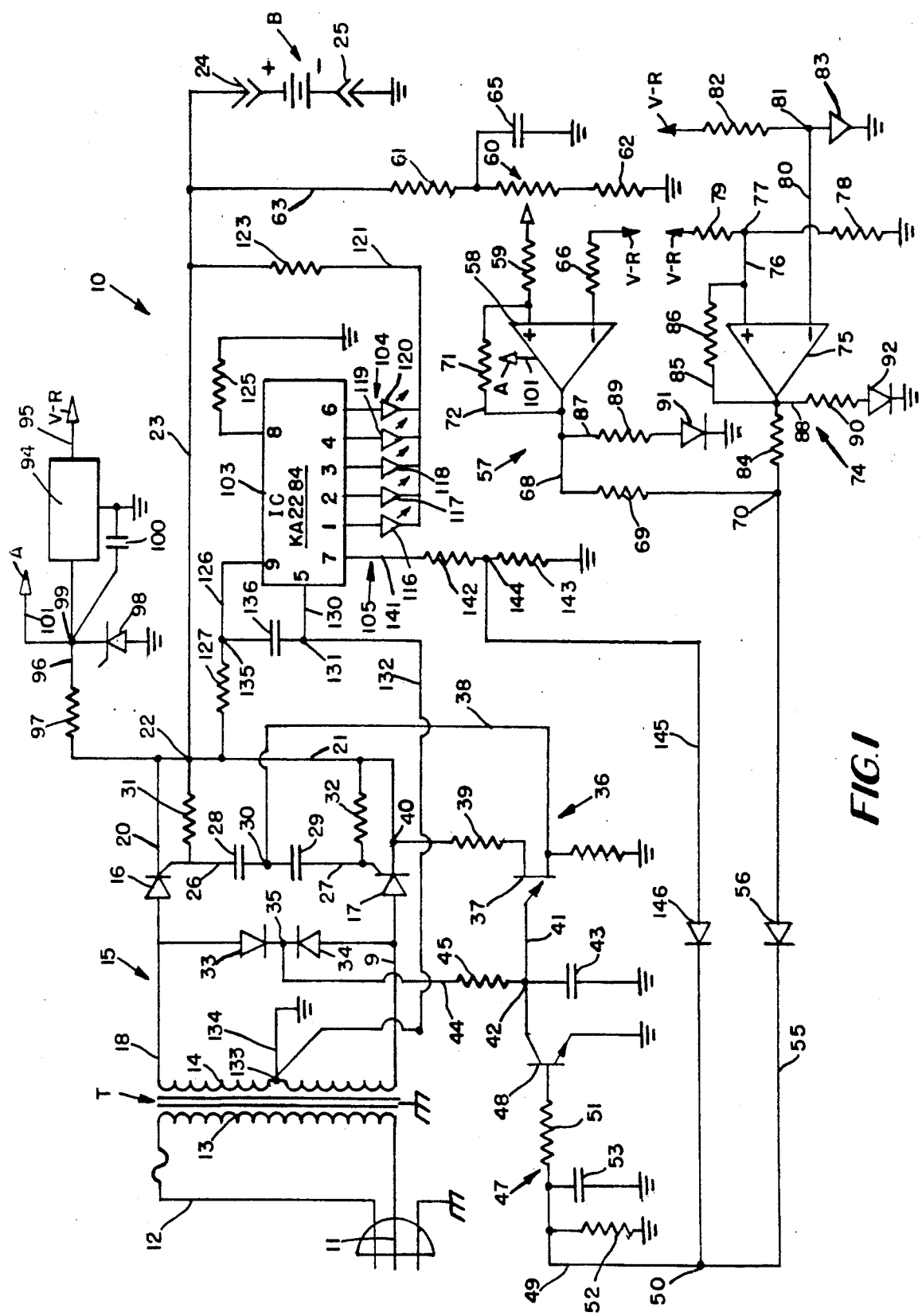
FIG. 1 is a schematic electronic circuit diagram of the battery charging system made in accordance with this invention.

Referring now to the drawings in more detail, FIG. 1 discloses a schematic diagram of the electrical battery charging system or circuit 10, made in accordance with this invention.

The system 10 includes an alternating current power source represented by the input connector or plug 11 connected to the AC input circuit 12 including the primary 13 of a transformer T having a stepped-down secondary coil 14.

The secondary coil 14 is connected in a full wave rectifier bridge circuit 15 including a pair of SCR's 16 and 17. The inputs of the corresponding SCR's 16 and 17 are connected to opposite ends of the secondary coil 14 through the corresponding leads 18 and 19. The outputs of the corresponding SCR's 16 and 17 are connected through leads 20 and 21, respectively, to a junction 22 connected to the battery charging circuit 23. The battery charging line 23 includes a positive contact 24 and a spaced grounded negative contact 25 for attachment or connection to the corresponding positive and negative terminals of a battery B to be charged.

Gate leads 26 and 27 for the respective SCR's 16 and 17, including corresponding capacitors 28 and 29, are connected together at junction 30. Each of the gate leads 26 and 27 is also connected to a corresponding resistive circuit 31 and 32 which are respectively connected in parallel with the corresponding SCR output lines 20 and 21.

In order to complete the rectifier circuit 15, a pair of diodes 33 and 34 are connected across the corresponding SCR's 16 and 17 from the corresponding input leads 18 and 19 to the junction 35.

The firing of the SCR's 16 and 17 is controlled by a relaxation oscillator circuit 36 including a unijunction 37. One side of the unijunction 37 is connected through lead 38 to the gate junction 30 of the SCR's, while the other side of the unijunction 37 is connected through resistor 39 to the junction 40 in the output line 21 of the SCR 17. The gate lead 41 for the unijunction 37 is connected to a junction 42, which is grounded through capacitor 43. The junction 42 is also connected through lead 44, including resistor 45, to the diode junction 35.

The unijunction relaxation oscillator circuit 36 is activated by a trigger circuit 47 including trigger transistor 48. The collector of the transistor 48 is connected to the junction 42, while the emitter is grounded. The base of the transistor 48 is connected through lead 49 to the control junction 50 The lead 49 includes a resistor 51. The grounded resistor 52 is connected in parallel with the trigger input lead 49. A grounded capacitor 53 is also connected in parallel with the trigger lead 49 in order to stabilize the trigger circuit 47 and to prevent any abrupt "on-off" cycling.

Connected to the trigger junction 50 through a control line or lead 55, including a diode 56, is a voltage control circuit 57. The voltage control circuit 57 includes a comparator 58. The positive input of the comparator 58 is connected through resistive lead 59 to a potentiometer 60 in a voltage divider network including resistors 61 and 62 connected in series through battery voltage input line 63 to the charging line 23, and in parallel with the battery B to be charged. The other end of the voltage input line 63 is grounded. Connected in parallel with the potentiometer 60 is a grounded capacitor 65 which functions to eliminate any spikes and reduces ripple to a minimum.

The negative input of the comparator 58 is connected through resistor 66 to a voltage reference source V-R.

The output of the comparator 58 is connected through output line 68, including the resistor 69, to the junction 70 the control line 55. A resistor 71 is connected in the feedback line 72 between the output lead 68 and the resistive positive input circuit 59 of the comparator 58.

Also connected to the junction 70 is a temperature control circuit 74 including a comparator 75, similar to the comparator 58. The positive input to the comparator 75 is connected through input lead 76 to junction 77, which is grounded through the resistor 78. The junction 77 is also connected through another resistor 79 to the voltage reference source V-R.

The negative input to the comparator 75 is connected through input lead 80 to junction 81, which is connected through resistor 82 to the voltage reference source V-R. The junction 81 is also connected to ground through a temperature sensing device or sensor shown as the diode 83, which is preferably located in contact with the transformer T.

The output from the temperature sensing comparator 75 is connected through the resistive output lead 84 to the junction 70. The output lead 84 is also connected through a feedback line 85 including resistor 86 to the positive input line 76.

The output leads 68 and 84 of the respective voltage control comparator 58 and the temperature control comparator 75, are grounded respectively through leads 87 and 88. The lead 87 includes in series a resistor 89 and a diode 91. The lead 88 includes in series a resistor 90 and a diode 92.

In a preferred form of the invention, each of the comparators 58 and 75 form one half of an integrated circuit, and specifically integrated circuit No. LM358.

A voltage regulator 94, preferably in the form of an integrated circuit No. 78L05 is provided to produce the output reference voltage V-R at the output 95. This output voltage V-R is supplied to the resistive lead 66 in the voltage control circuit 57 and to the resistive leads 79 and 82 in the temperature control circuit 74.

The voltage regulator 94 is supplied with direct current from the junction 22 through the input lead 96 including resistor 97. The input lead 96 is grounded through the Zener diode 98, between the resistor 97 and the voltage regulator 94 at the junction 99. The junction 99 is also connected through the capacitor 100 to ground and to the voltage regulator 94, as illustrated in FIG. 1.

The junction 99 also supplies voltage through the lead 101 represented by the connections A to the voltage control comparator 58. Preferably, the voltage regulator 94 produces a very precise and constant reference voltage of approximately 5 volts DC.

Figure 2:
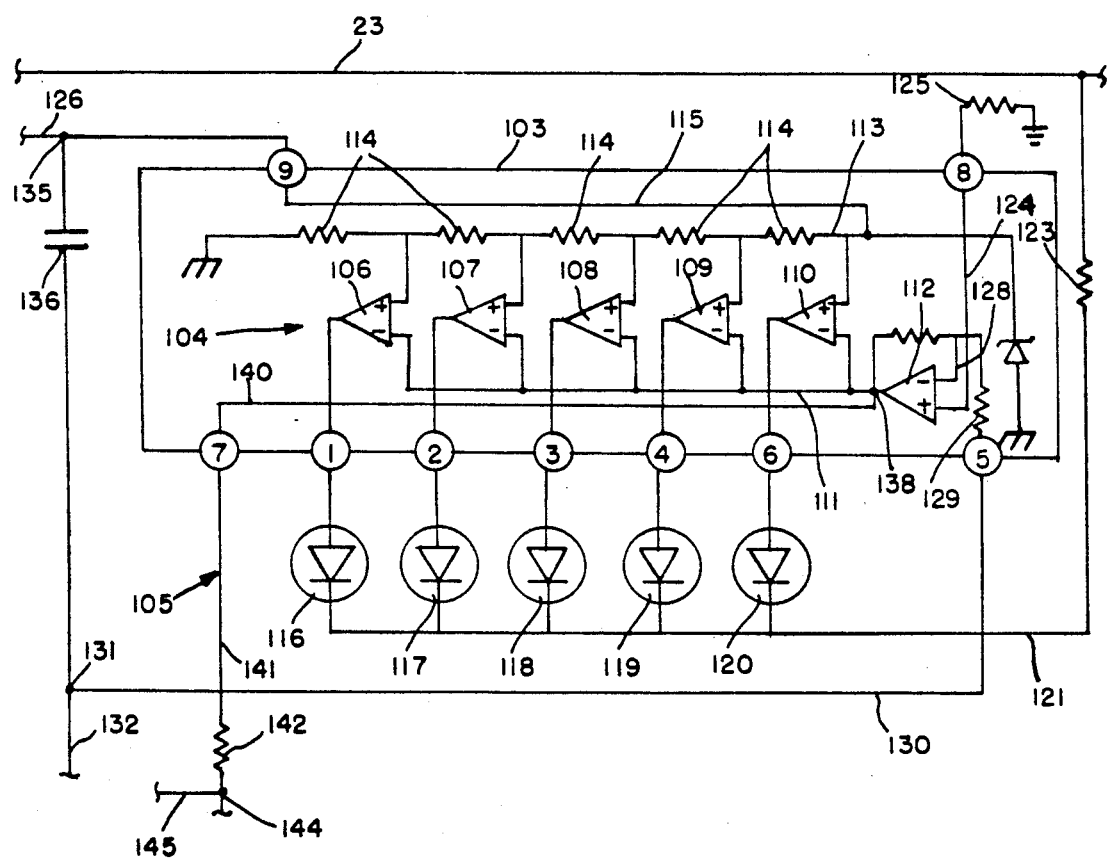
FIG. 2 is an enlarged circuit diagram of the combined electronic current limiting circuit and the charge current signalling circuit.

As best disclosed in FIGS. 1 and 2, an integrated circuit 103 such as an IC KA2284 has been modified to function as a combined signal meter or signal circuit 104 and an electronic current limiting control circuit 105.

As best disclosed in FIG. 2, the signal circuit 104 includes a plurality of, such as five, signal operating amplifiers 106, 107, 108, 109, and 110. The negative inputs of the amplifiers 106–110 are connected in parallel with each other to the output line 111 from a high gain operational amplifier 112.

The positive inputs to the signal amplifiers 106–110 are connected in parallel with each other to a voltage divided input line 113 including in series a plurality of resistors 114. One end of the voltage input lead 113 is connected through lead 115 to pin 9 of the integrated circuit 103, whereas the opposite end of the voltage divided line 113 is grounded. Each of the positive input leads to the signal amplifiers 106–110 is connected to the input line 111 on the high or positive side of a corresponding resistor 114.

Each of the output lines from the signal amplifiers 106–110 is connected through a respective pin 1, 2, 3, 4, and 6 to their corresponding electrical signal devices, such as the lamps or LED's 116, 117, 118, 119, and 120. All of the LED's 116–120 are connected in parallel to a common line 121, including a resistor 123, which in turn is connected to the current charging line 23.

The positive input to the high gain operating amplifier 112 is connected through input lead 124 to pin 8, which in turn is grounded through resistor 125.

The pin 9 is connected through Vcc input lead 126, including resistor 127, to the DC current charging line 23, such as through junction 22.

The negative output of the high gain operational amplifier 112 is connected through lead 128 and resistor 129 to the pin 5. Pin 5 is connected through the negative Vee lead 130 to junction 131, which in turn is connected through the lead 132 to the center tap point 133 of the secondary coil 14 of the transformer T. Also connected to the center tap point 133 is a grounded resistive connecting line or wire 134 of predetermined resistance. Connecting the junction 135 in the voltage input line 126 to the junction 131 is a coupling capacitor 136.

Connected to the junction 138 in the output line 111 between the negative input to the signal amplifier 110 and the output of the operational amplifier 112, is current output line 140, connected internally of the integrated circuit 103 to the output pin 7. Connected externally to the pin 7 is the voltage divided output line 141, including resistors 142 and 143 divided by junction 144.

A second control line 145, including diode 146, connects divided junction 144 to the trigger junction 50 in parallel with the control line 55.

In the operation of the system 10, the opposite terminals of a battery B, such as a 12-volt battery, to be charged are connected to their corresponding connectors or contacts 24 and 25 in the charging circuit 23. The AC plug 11 is inserted into a mating conventional AC outlet, such as a 120 VAC source, not shown, and the system 10 is then in a condition for automatic operation, and for commencing the charge to the battery B.

The 120 volts AC is stepped down by the transformer T. The center tap 133 in the secondary coil 14 connected to the grounded resistive wire or line 134, as shown in FIG. 1, produces a pulsed negative DC current which is supplied to the rectifier circuit 15.

Firing pulses are supplied to the SCR's 16 and 17 through the gate leads 26 and 27 from the relaxation oscillator circuit 36 and the capacitors 28 and 29, respectively. The diodes 33 and 34 in the bridge circuit 15 synchronize the firing pulses produced by the unijunction 37 in the relaxation oscillator circuit 36 with the alternating current or pulsed DC current in the rectifier circuit 15, through the RC timer circuit including the resistor 45, the capacitor 43, junction 42 and gate lead 41.

There are two conditions under which the unijunction 37 will not oscillate. One of these conditions is when there is no direct current voltage on the unijunction 37, such as when the battery B is not connected to the contacts 24 and 25. The other condition under which the unijunction 37 will not oscillate is when the trigger transistor 48 is "on" or conducting.

The resistor 39 provides proper biasing to the unijunction 37 when a battery B is connected to the charging circuit 23.

If the battery B is a 12-volt storage battery, then, in a preferred form of the charging system 10, only about 7 volts on the battery's terminals is sufficient to permit the unijunction 37 to oscillate, thus starting the charging cycle.

When the charging system 10 is energized and the battery B is connected, direct current is supplied from the junction 22 to the voltage regulator 94, in order to produce a precise and constant reference voltage V-R. This reference voltage V-R is applied, as shown in FIG. 1, through the correspondingly identified contacts to the resistor 66 in the negative input to the comparator 58, the resistor 79 to the positive input of the comparator 75, and also to the resistor 82 to the negative input of the comparator 75 and to the temperature sensor 83.

Furthermore, supply voltage is furnished through the lead 101 through the contact A to the voltage control comparator 58.

The voltage control circuit 57 is so designed, that it monitors the voltage on the battery B while the battery B is being charged and after the battery B has received its full charge. The electrical characteristics of the voltage control circuit 57 are such that when the battery B is fully charged to its 12 volts, its voltage is compared with the reference voltage V-R. When the battery voltage exceeds 12 volts, or its fully charged voltage, the output through the lead 68 and junction 70 forward biases the diode 56 in the control line 55, which produces a voltage through the junction 50 to the base of the trigger transistor 48. The transistor 48 is biased into conduction to turn off or deenergize the unijunction 37. Thus, the entire system 10 will be shut off if the voltage on the battery B has attained a fully charged or maximum value.

In a similar manner, if the temperature sensor 83 senses a temperature in excess of a predetermined value indicative of an unsafe heated condition, such as in the transformer T, a signal is produced in the resistive output lead 84 from the comparator 75 and forward biases the diode 56, again, producing conduction of the trigger transistor 48 to turn off the unijunction 37. Thus, the charging current through the charging circuit 23 will be shut off when the system 10 is overheated.

When the battery voltage and/or the temperature of the transformer T have returned to values below their maximum trigger values, the unijunction 37 will automatically be turned on again to transmit charging current through the charging circuit or line 23 to the battery B.

The integrated circuit 103 performs a dual function, first as a current limiting circuit, and secondly as a signal circuit for indicating the progressive magnitude of the charging current.

As best illustrated in FIGS. 1 and 2, direct current is supplied from the junction 22 through the supply voltage lead 126 to the pin 9 and supplies a positive voltage Vcc to the integrated circuit.

A voltage which is more negative than the Vcc supply voltage impressed upon the pin 9, is supplied through the pin 8 to the positive input of the high gain operating amplifier 112. In a preferred form of the invention, the voltage supplied through pin 8 is zero or ground voltage.

The voltage Vee supplied to the negative input of the high gain operating amplifier 112 is more negative than the voltage supplied to the positive input of the amplifier 112. Thus, where the voltage supplied through the pin 8 is zero or ground, the voltage Vee supplied through pin 5 will be a negative voltage. This negative voltage supplied to the pin 5 is transmitted through the lead 130 and the connecting line 132 from the center tap 135 of the secondary coil 14 of the transformer T. Although the voltage at the center tap 135 is generally zero or ground voltage, in the system 10, the resistive line or wire 134 extends from the center tap 135 to ground in order to provide a negative voltage upon the center tap 135. In a specific example, the wire 134 has a resistive characteristic which will produce a voltage of $-0.1$ volts.

As the charging current increases in the line 23, the signal elements or lamps or LED's 116–120 are progressively illuminated commencing with the LED 116. After each LED is energized, it remains illuminated while subsequent LED's are being illuminated. Each of the LED's 116–120 will be accorded predetermined values in order to indicate the amperes represented by the charging current transmitted through the charging circuit 23.

After all of the LED's 116-120 have been illuminated and the battery B is fully charged, any excess charging current will be sensed by the high gain operating amplifier 112 in order to produce a signal which is transmitted through the lead 140, the pin 7 and the divided voltage circuit 141 to forward bias the diode 146 in the control line 145. The resulting signal at the trigger junction 50 will cause the trigger transistor 48 to conduct and turn off the unijunction 37.

Thus, the system 10 will not only efficiently and automatically charge a battery B, but includes three safety circuits which will turn off the system 10 to stop the flow of battery charging current through the line 23 upon detection of an excessive voltage in the battery, an excessive current in the line 23, or an excessive temperature in the transformer T.

It will be understood, of course, that the temperature element 83 may be placed on any other element in the system 10 than the transformer T, if desired.

The method of connecting the IC circuit 103 to the center tap 135 of the secondary transformer coil 14 having a grounded resistive lead 134 is unique and provides a simplified means of supplying the differential voltages to the IC circuit 103.

In a preferred form of the invention, the current limiting circuit 105, including the IC circuit 103, is designed to limit the charge current in the charging line 23 to approximately 10 amps DC.

The capacitor 136 functions as a de-coupling capacitor the input positive voltage applied at the pin 9 and the negative voltage applied at the pin 5 in order to eliminate noise.

The pulsed negative DC current supplied through the connecting lead 132 is opposite in charge to, and has the same timing as, the pulsed positive DC charging current supplied through the voltage supply line 126 to the pin 9.

Although it might be possible to provide a current limiting circuit by attempting to match the pulsed positive DC charging current on the pin 9 with a pulsed positive DC current of lesser value at the pin 8, and to ground the pin 5, nevertheless, such an arrangement would be quite difficult and less reliable.

What is claimed is:

1. A controlled battery charging system for charging a battery having terminals, comprising:
   (a) a transformer having a primary coil connected to a source of alternating current, and a secondary coil having output leads and a center tap,
   (b) full wave rectifier means connected to the output leads to said secondary coil, said rectifier means including a pair of gate controlled rectifiers having direct current output leads,
   (c) a battery charging circuit connected to said output leads to said rectifiers and having output means electrically contacting the terminals of a battery to be charged,
   (d) a unijunction relaxation oscillator circuit connected to said rectifiers to trigger said gate controlled rectifiers into conduction to produce a DC charging current in said charging circuit,
   (e) an electronic current limiting control circuit comprising a current limiting amplifier having a positive input, a negative input, and an output,
   (f) a resistive line connected to said center tap,
   (g) a negative input lead connecting said center tap to said negative input of said current limiting amplifier,
   (h) voltage input means connected to said positive input for supplying a voltage to said current limiting amplifier more positive than a voltage supplied to said negative input,
   (i) voltage supply means connecting said current limiting amplifier to said battery charging circuit, and
   (j) control means connecting said output of said current limiting amplifier to said unijunction relaxation oscillator circuit operative to turn off said DC charging circuit when said charging current exceeds a predetermined current value.

2. The invention according to claim 1 in which said voltage supply means comprises a plurality of signal amplifiers, each signal amplifier having a positive input, a negative input and an output, means for supplying voltage to all of said positive inputs more positive than the voltage supplied to said positive input of said current limiting amplifier, means coupling said output of said current limiting amplifier to said negative inputs of said signal amplifiers, a plurality of electrical signal indicators, one indicator corresponding to each signal amplifier, and means for sequentially supplying a voltage from the output of each said signal amplifier to said corresponding signal indicator to register successively increasing values of said charging current.

3. The invention according to claim 2 in which said means for supplying voltage to all of said positive inputs comprises a voltage input lead connecting each of said positive inputs of said signal amplifiers to said direct current output leads of said rectifier means.

4. The invention according to claim 3 in which said means for sequentially supplying a voltage from the outputs of each said signal amplifier to said corresponding signal indicator comprises a signal output lead connecting each of said outputs of said signal amplifiers to its corresponding signal indicator, a common line connecting said electrical signal indicators to said battery charging circuit.

5. The invention according to claim 4 in which said means for sequentially supplying a voltage from the outputs of each said signal amplifier to said corresponding signal indicator further comprises a plurality of voltage divider resistors, one of said voltage divider resistors corresponding to each of said signal amplifiers, said voltage divider resistors being connected in series with said voltage input lead, said means for supplying voltage to all of said positive inputs comprising a signal input lead for each of said signal amplifiers, said signal input leads being connected in parallel with each other and to said voltage input lead, said signal input leads being separated by said voltage divider resistors.

6. The invention according to claim 1 in which said control means comprises a trigger transistor having a base and a collector electrically connected to said unijunction relaxation oscillator circuit in order to energize said oscillator circuit when said trigger transistor is non-conducting, a control output line electrically connecting the output of said current limiting amplifier to the base of said trigger transistor whereby a charging current in excess of said predetermined current value in said control output line actuates said trigger transistor into conduction to de-energize said unijunction relaxation oscillator circuit and turn off said charging current.

7. The invention according to claim 6 further comprising a temperature control comparator having a pair of inputs, and an output, an electrical temperature sensor device electrically connected to one of said inputs of said temperature control comparator for sensing the temperature of said transformer, a temperature control lead connected to the output of said temperature control comparator and to the base of said trigger transistor for actuating said trigger transistor into conduction in order to de-energize said unijunction relaxation oscillator circuit when the value of said temperature exceeds a predetermined temperature value.

8. The invention according to claim 6 further comprising a voltage control comparator having a pair of inputs and an output, voltage divider means connecting one of said inputs of said voltage control comparator to said battery charging circuit, and a voltage control lead connecting the output of said voltage control comparator to said base of said trigger transistor for actuating said trigger transistor into conduction and to de-energize said unijunction relaxation oscillator circuit when the voltage in said battery charging circuit exceeds a predetermined value.

9. The invention according to claim 8 further comprising a temperature control comparator having a pair of inputs, and an output, an electrical temperature sensor device electrically connected to one of said inputs of said temperature control comparator for sensing the temperature of said transformer, a temperature control lead connected to the output of said temperature control comparator and to the base of said trigger transistor for actuating said trigger transistor into conduction in order to de-energize said unijunction relaxation oscillator circuit when the value of said temperature exceeds a predetermined temperature value.

10. The invention according to claim 9 further comprising a voltage regulator and means for connecting said voltage regulator to said inputs of said temperature control comparator and said voltage control comparator, respectively.

* * * * *